US012780702B2

(12) United States Patent
Jung et al.

(10) Patent No.: US 12,780,702 B2
(45) Date of Patent: Nov. 3, 2026

(54) CARRIER WITH ADJUSTABLE BIOFILM THICKNESS

(71) Applicant: TOMORROW WATER, Anaheim, CA (US)

(72) Inventors: Min Ki Jung, Daejeon (KR); Tae Seok Oh, Daejeon (KR); Yun Su Lim, Daejeon (KR); Dae Hwan Rhu, Yeoju-si (KR); Ghimire Umesh, Artesia, CA (US)

(73) Assignee: TOMORROW WATER, Anaheim, CA (US)

( * ) Notice: Subject to any disclaimer, the term of this patent is extended or adjusted under 35 U.S.C. 154(b) by 354 days.

(21) Appl. No.: 18/581,649

(22) Filed: Feb. 20, 2024

(65) Prior Publication Data

US 2024/0199458 A1 Jun. 20, 2024

Related U.S. Application Data

(63) Continuation of application No. PCT/KR2022/001565, filed on Jan. 28, 2022.

(30) Foreign Application Priority Data

Sep. 10, 2021 (KR) ........................ 10-2021-0121324
Nov. 9, 2021 (KR) ........................ 10-2021-0152995
Nov. 9, 2021 (KR) ........................ 10-2021-0153000

(51) Int. Cl.
*C02F 3/00* (2023.01)

(52) U.S. Cl.
CPC .......... *C02F 3/006* (2013.01); *C02F 2209/36* (2013.01)

(58) Field of Classification Search
None
See application file for complete search history.

(56) References Cited

U.S. PATENT DOCUMENTS

2008/0292675 A1* 11/2008 Edermatt .............. A61L 17/005
977/773

FOREIGN PATENT DOCUMENTS

| | | | |
|---|---|---|---|
| JP | H09239388 A | 9/1997 | |
| JP | H10156320 A | 6/1998 | |
| JP | 2003-260481 A | 9/2003 | |
| KR | 2005-0054645 A | 6/2005 | |
| KR | 2019-0108327 A | 9/2019 | |
| WO | WO-2015072364 A1 * | 5/2015 | ............. B29C 41/26 |

OTHER PUBLICATIONS

Translation for KR20050054645A (obtained Mar. 2026).*
Translation for WO-2015072364-A1 (obtained Mar. 2026).*

* cited by examiner

*Primary Examiner* — Richard C Gurtowski
(74) *Attorney, Agent, or Firm* — Dinsmore & Shohl LLP; Yongsok Choi, Esq.

(57) ABSTRACT

Disclosed is a carrier, of which biofilms are appropriately adjustable in thickness. In accordance with an aspect of the present disclosure, there is provided a complex carrier included in one component of a sewage treatment apparatus to allow microorganisms to be attached and grown therein. The complex carrier includes a first carrier having a plural spaces for microorganisms to be attached therein to allow microorganisms to be attached and grown therein; and a second carrier having a structure capable of penetrating or passing through the spaces of the first carrier to adjust the thickness of biofilms formed in the spaces of the first carrier.

11 Claims, 10 Drawing Sheets

【Figure 1】
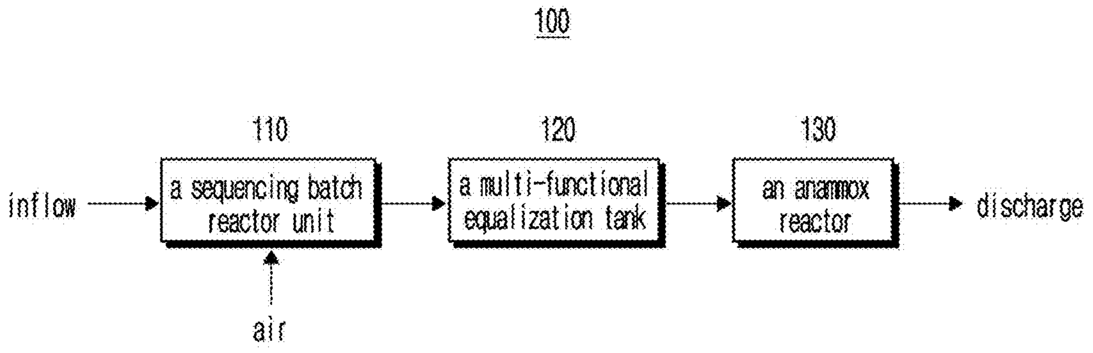

【Figure 2】
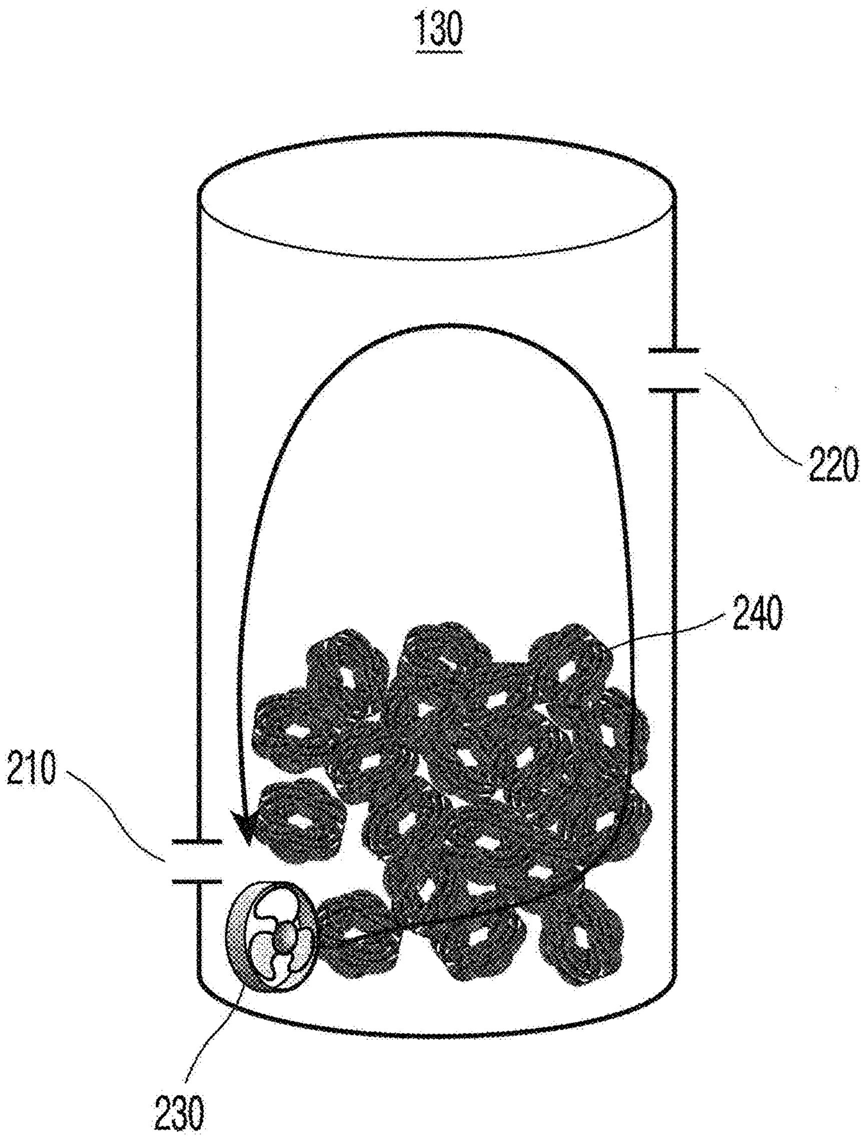
【Figure 3】
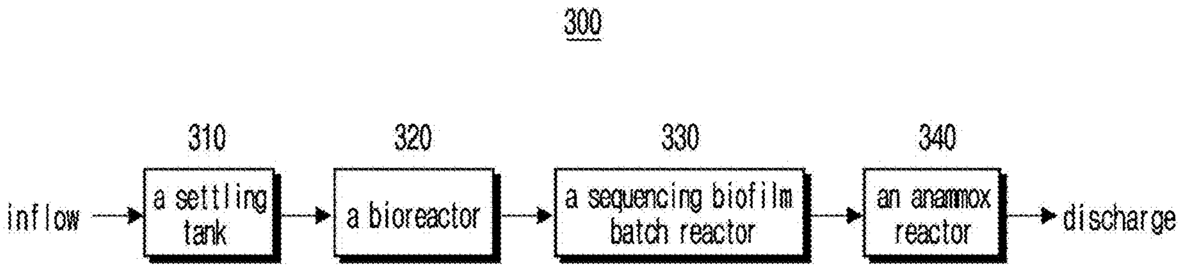

【Figure 4】
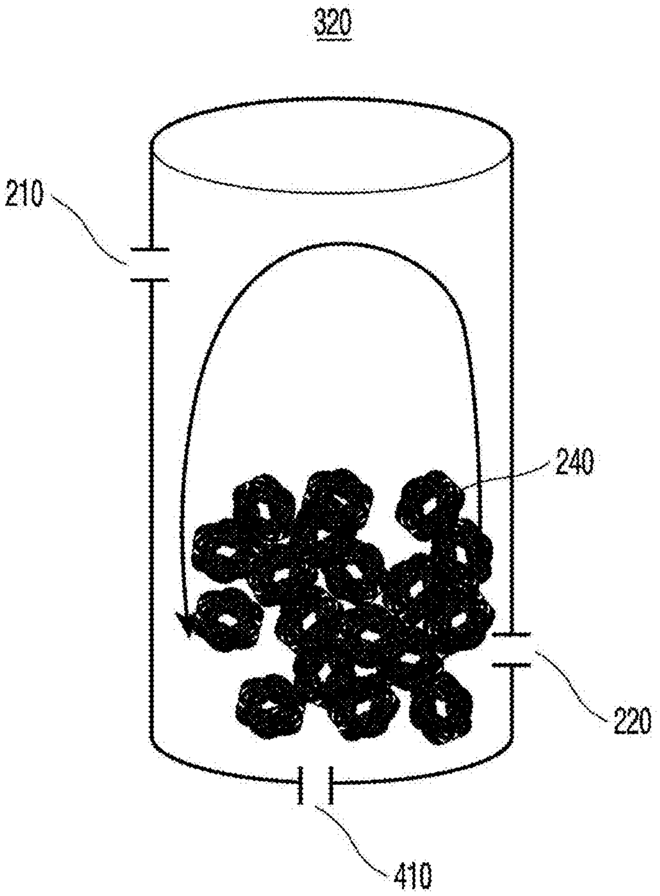

【Figure 5】
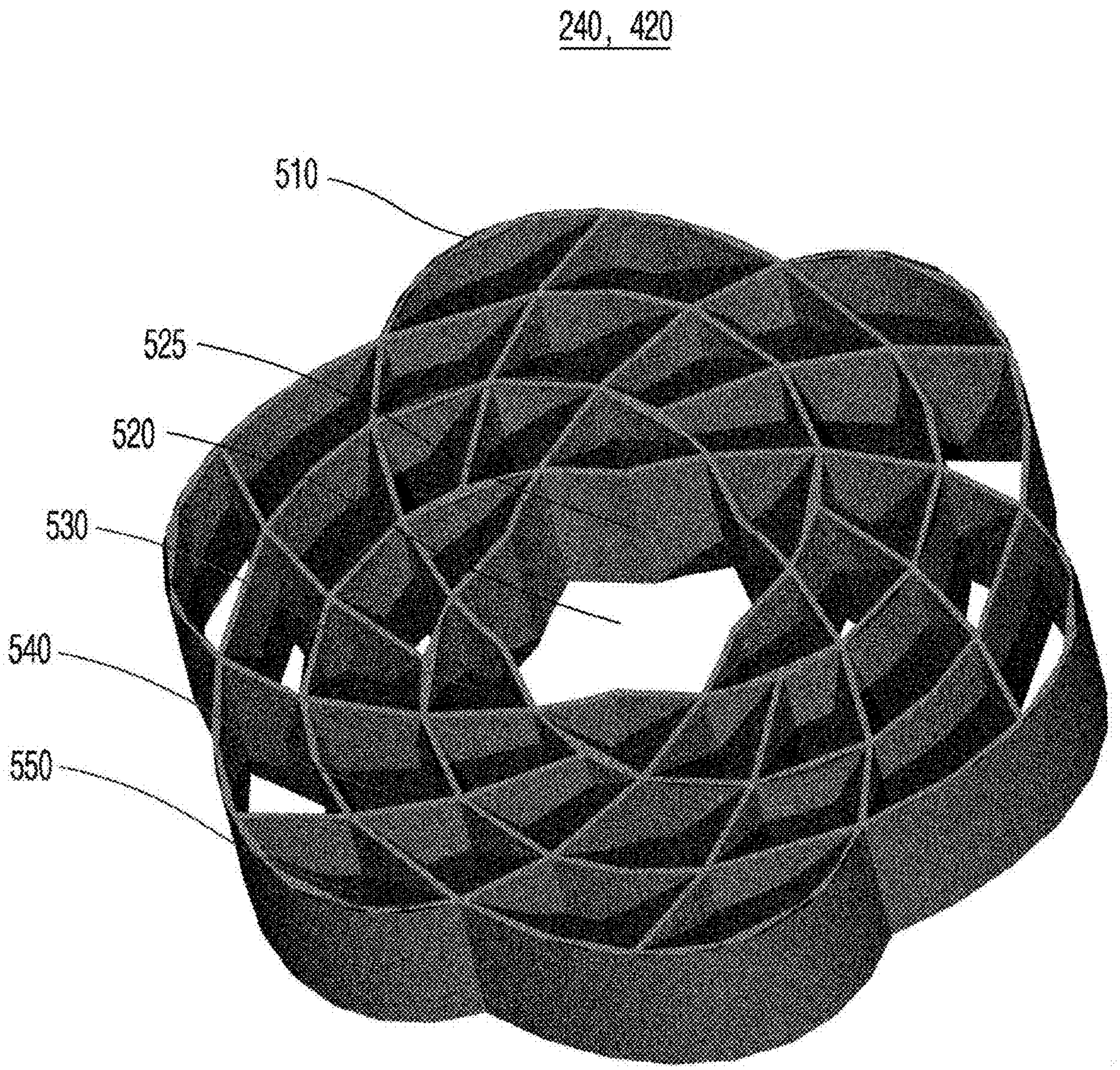

【Figure 6】
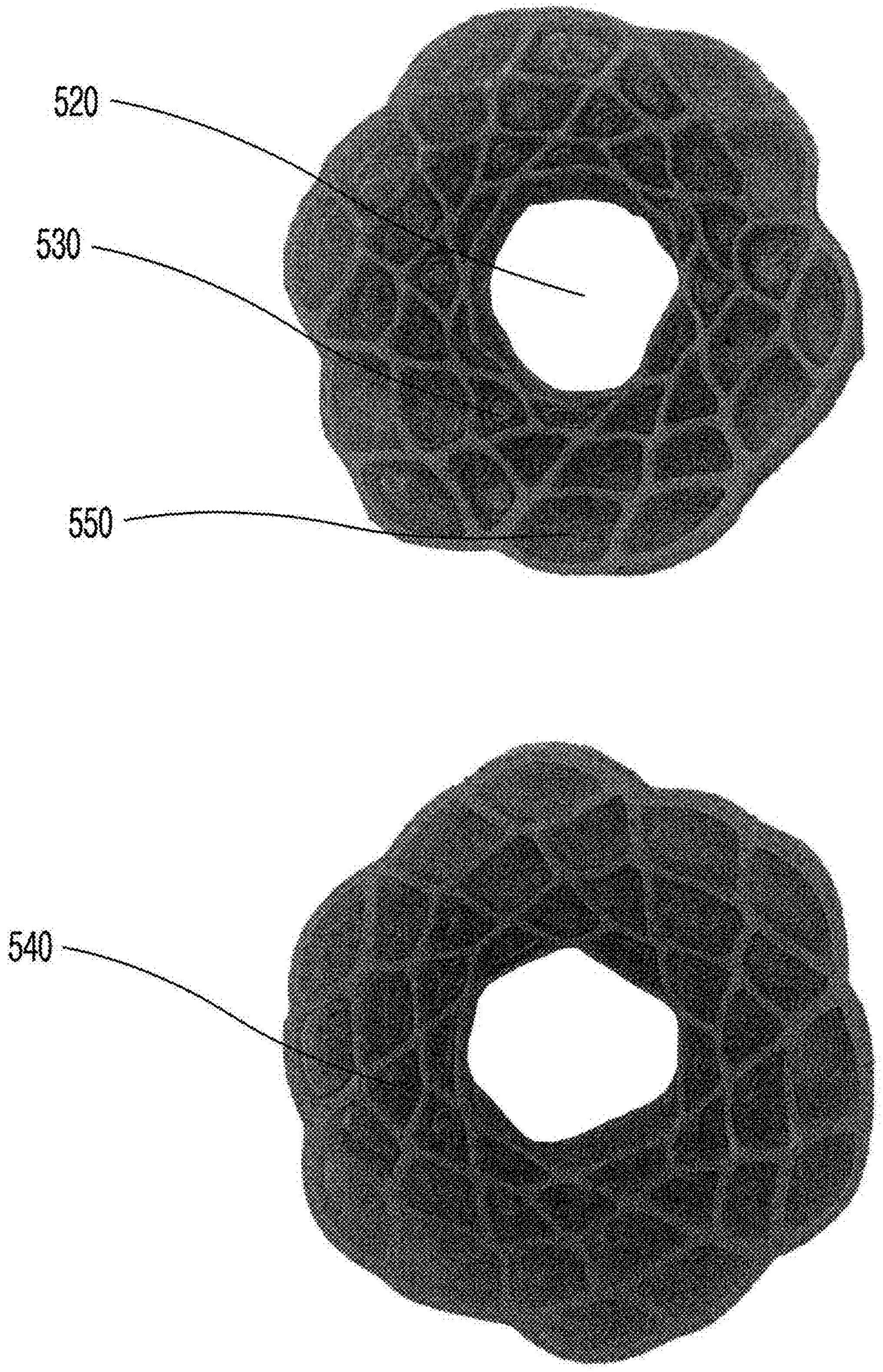

【Figure 7A】
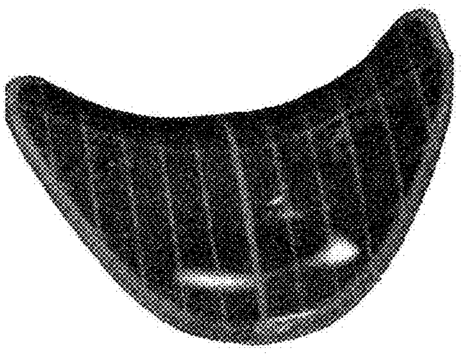
【Figure 7B】
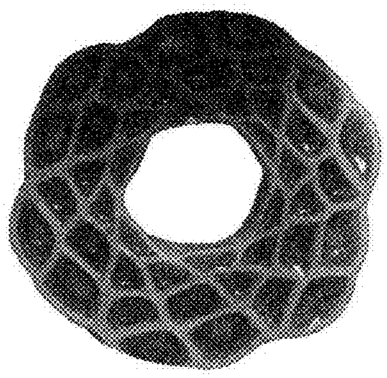
【Figure 8】
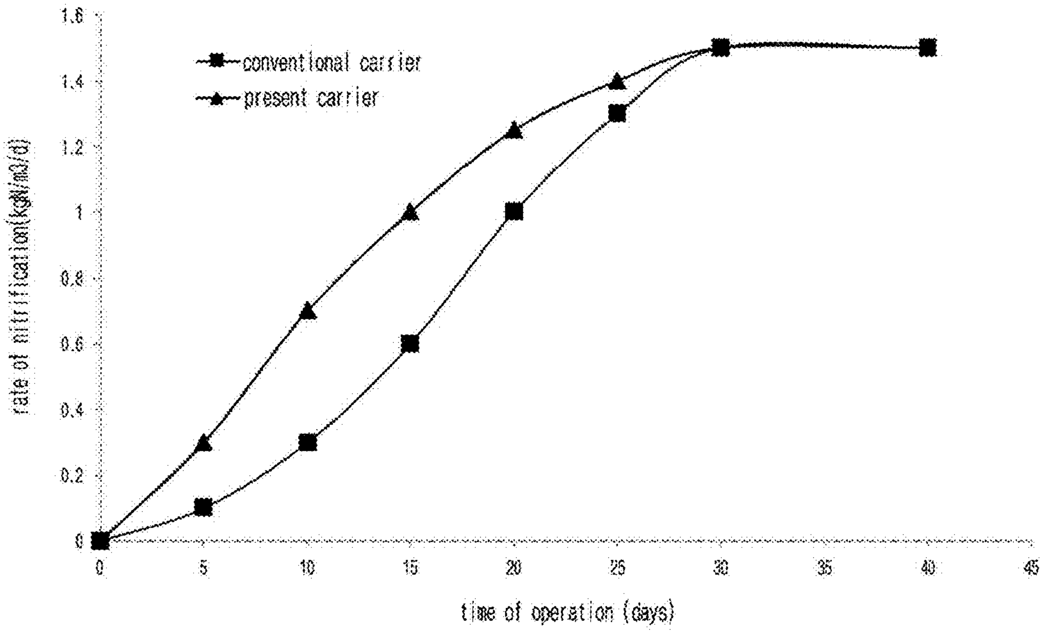

【Figure 9】
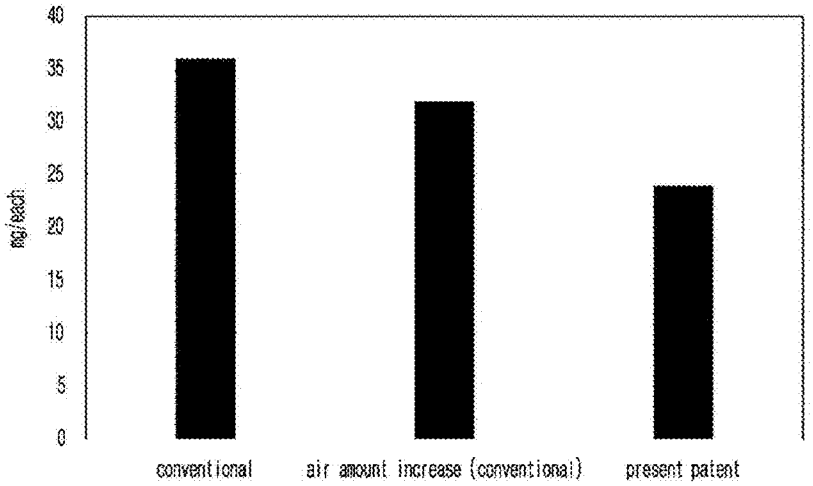
【Figure 10】
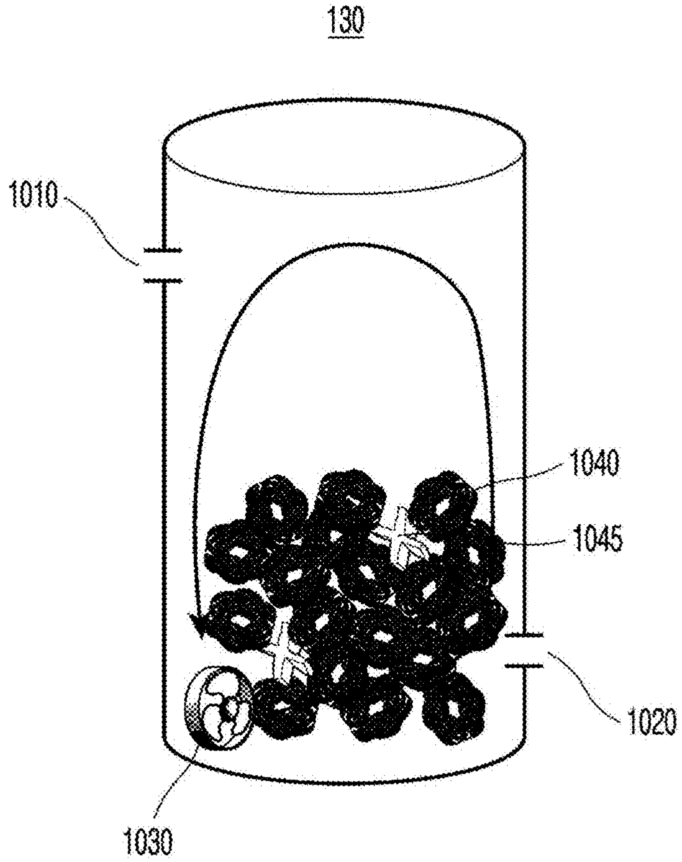

【Figure 11】
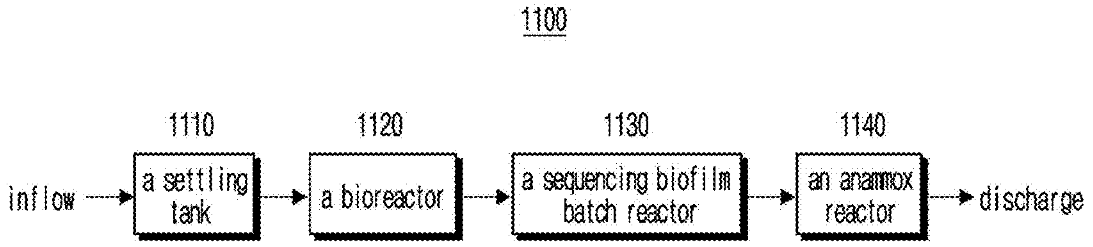
【Figure 12】
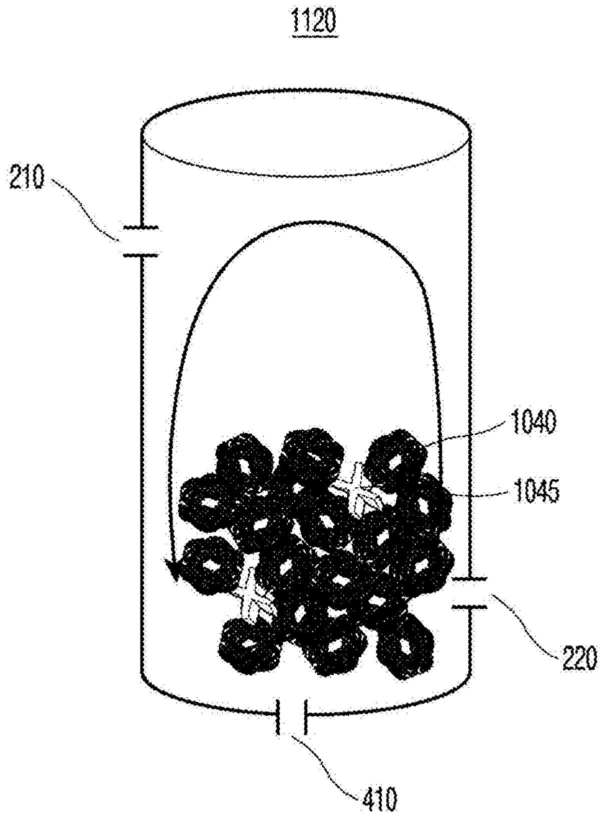

【Figure 13】
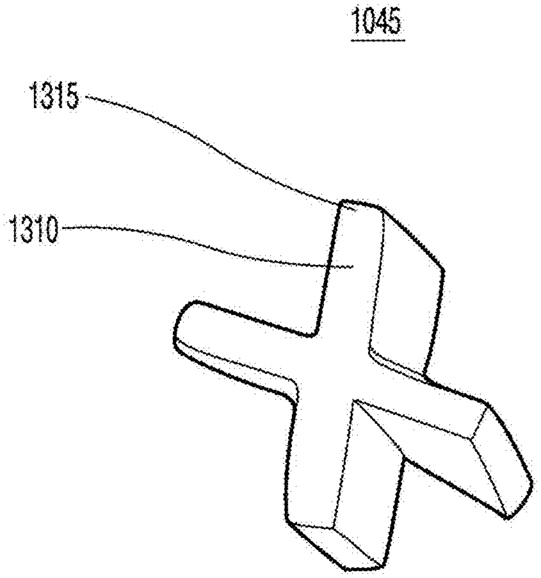
【Figure 14】
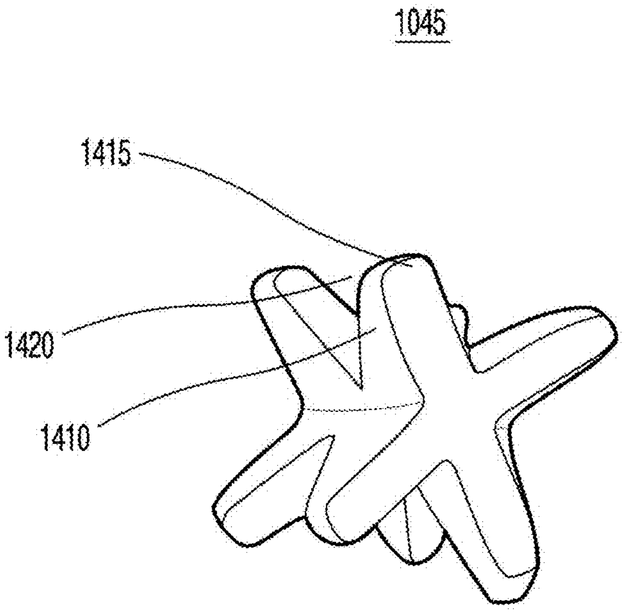

【Figure 15】
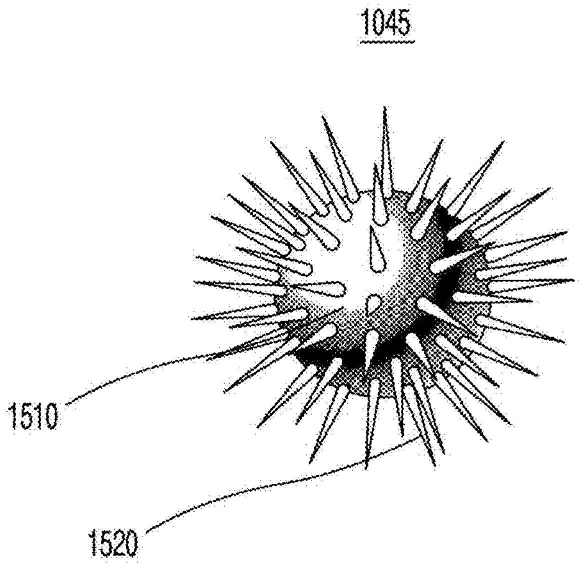

CARRIER WITH ADJUSTABLE BIOFILM THICKNESS

CROSS-REFERENCE TO RELATED APPLICATIONS

This application is a continuation of International Application No. PCT/KR2022/001565 filed on Jan. 28, 2022, which claims priority to Korean Patent Application No. 10-2021-0121324 filed on Sep. 10, 2021, Korean Patent Application No. 10-2021-0152995 filed on Nov. 9, 2021, and Korean Patent Application No. 10-2021-0153000 filed on Nov. 9, 2021, the entire contents of which are herein incorporated by reference.

TECHNICAL FIELD

The present disclosure relates to a carrier, which biofilm thickness on carrier is appropriately controlled.

BACKGROUND ART

Descriptions in this section merely provide background information about embodiments of the present disclosure and do not constitute prior art.

In general, biological wastewater treatment using microorganisms does not use chemicals that may cause secondary contamination. Applications of biological treatment have been increased now days. Biological wastewater treatment is mainly used on domestic wastewater but could also be widely used on the wastewater from different fields like fish farms, chemical industries, and food industries.

The development of carriers that support the spaces for microorganisms and prevent washing out of microorganisms is important in wastewater treatment technologies. However, the conventional carrier has a limitation that it is difficult to control the thickness of the biofilm as desired. If the microorganisms are excessively grown on the carrier and the thickness of the biofilm becomes too thick, the substrate is not sufficiently diffused into the microorganisms located in deep inside of the biofilm, and eventually, the microorganisms are detached from the carrier.

For this reason, the surface of area and the number of microorganisms is decreased, results in decreasing removal rate.

To solve this problem, the prior art has made it possible to control the thickness of the biofilm by occurring a collision between the carriers by mixing them. However, there was a problem that considerable energy is consumed to move the carriers more.

DISCLOSURE

Technical Problem

An aspect of the present disclosure is to provide a carrier, of which biofilm thickness can be controlled without additional energy consumption.

Technical Solution

According to one aspect of the present invention, a sewage treatment device includes dual carriers to attach and dig out biofilms respectively. The first carrier has a spaces which microorganisms can attach on. The second carrier has a structure of piercing or digging out biofilms from the first carrier to control the thickness of the biofilm formed in the space of the first carrier.

According to the present invention, the second carrier includes plural protrusions to each direction with respect to the center.

According to the present invention, the second carrier includes plural protrusions to each direction with respect to the center, and each protrusion has a valley and at least two tips.

According to the present invention, the valley is characterized in that it has a recessed shape by a preset depth.

According to the present invention, the valley may be formed in a "V" shape or a "U" shape.

According to the present invention, the tip has a smaller diameter than the diameter of the space of the first carrier.

According to the present invention, the second carrier includes a tip portion having a structure protruding at regular intervals or randomly from the body.

According to the present invention, a central space provides an area where microorganisms can attach in. The first space positioned in a direction away from the center provides an area where microorganisms can attach on. The second space located next to the first space provides an area where microorganisms can attach on, and the third space located on the outermost side provides an area where microorganisms can attach on. It provides a carrier that the area increases in the order of the first space, the second space, the third space, and the central space.

According to the present invention, the central area has an enough space not blocked by microorganisms regardless of time long.

According to this invention, the above central space is characterized by allowing wastewater to pass through itself, allowing the carrier to rotate itself According to the present invention, the shear force of each space is increased in the order of the first space, the second space, and the third space.

According to the present invention, the carrier has protrusions smoothly protruding to the outside with preset space on the outer surface.

According to the present invention, the protrusion increases the impact force when the carriers collide with each other.

Advantageous Effects

As explained above, according to an aspect of the present disclosure, additional energy consumption can be avoided in maintaining the thickness of biofilms attached and grown in a carrier.

DESCRIPTION OF DRAWINGS

FIG. 1 is a schematic diagram of a sewage treatment apparatus according to a first embodiment of the present disclosure.

FIG. 2 shows components of an anammox reactor according to the first embodiment of the present disclosure.

FIG. 3 is a schematic diagram of a sewage treatment apparatus according to a second embodiment of the present disclosure.

FIG. 4 shows components of a sequencing biofilm batch reactor (SBBR) according to the second embodiment of the present disclosure.

FIG. 5 shows the structure of a carrier according to an embodiment of the present disclosure.

FIG. 6 shows an example of the carrier according to the embodiment of the present disclosure.

FIGS. 7A and 7B show a conventional carrier and the carrier according to the embodiment of the present disclosure when operated for some period of the time.

FIG. 8 is a graph showing the nitrification rates of the conventional carrier and the carrier according to the embodiment of the present disclosure.

FIG. 9 is a graph showing the weights of biomass on the conventional carrier and the carrier according to the embodiment of the present disclosure when operated for some period of the time.

FIG. 10 shows components of an anammox reactor according to a third embodiment of the present disclosure.

FIG. 11 is a schematic diagram of a sewage treatment apparatus according to a fourth embodiment of the present disclosure.

FIG. 12 shows components of a sequencing batch biofilm reactor according to the fourth embodiment of the present disclosure.

FIG. 13 shows a structure of a second carrier according to an embodiment of the present disclosure.

FIG. 14 shows a different structure of a second carrier according to another embodiment of the present disclosure.

FIG. 15 shows another different structure of a second carrier according to still another embodiment of the present disclosure.

MODE FOR INVENTION

Since the present disclosure may be modified in various forms and may have various embodiments, specific embodiments are illustrated in the accompanying drawings and are described in detail with reference to the drawings. However, this is not intended to limit the present disclosure to specific embodiments, and the present disclosure should be construed to encompass various changes, equivalents, and substitutions within the technical scope and spirit of the invention. Like numbers refer to like elements throughout in the description of each drawing.

It will be understood that, although the terms first, second, A, B, and the like may be used herein to describe various elements, these elements should not be limited by these terms. These terms are only used to distinguish one element from another. For example, a first element could be termed a second element, and, similarly, a second element could be termed a first element without departing from the scope of the present disclosure. The term "and/or" includes a combination of a plurality of the associated listed items or any item among a plurality of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" "includes" or "has" when used herein do not preclude the possibility of the presence or addition of the features, integers, steps, operations, elements, components, or combinations thereof described in the specification.

Unless otherwise defined, all terms (including technical and scientific terms) used herein have the same meaning as commonly understood by one of ordinary skill in the art to which this invention belongs.

It will be further understood that terms used herein should be interpreted as having a meaning that is consistent with their meaning in the context of this specification and the relevant art and will not be interpreted in an idealized or overly formal sense unless expressly so defined herein.

The components, processes, steps, or methods included in respective embodiments of the present disclosure may be shared as long as they do not technically conflict with each other.

FIG. 1 is a schematic diagram of a sewage treatment apparatus according to a first embodiment of the present disclosure.

Referring to FIG. 1, a sewage treatment apparatus 100 according to a first embodiment of the present disclosure includes a sequencing batch reactor unit 110, a multi-functional equalization tank 120, and an anammox reactor 130.

The sequencing batch reactor unit 110 receives wastewater having a high concentration of nitrogen and air from the outside and adjusts the concentration ratio of ammonia and nitrite nitrogen to a preset ratio. In The sequencing batch reactor unit 110, wastewater having a high concentration of nitrogen, particularly, a high concentration of free ammonia, is flowed into from the outside. For example, the wastewater flowing into the sequencing batch reactor unit 110 may be a liquid from equipment dewatering sludge from an anaerobic digester. The wastewater having a high concentration of nitrogen is introduced into the sequencing batch reactor unit 110. At the same time, air (or oxygen) is introduced the sequencing batch reaction apparatus the sequencing batch reactor unit 110 to oxidize ammonia nitrogen to nitrite nitrogen. The sequencing batch reactor unit 110 makes partial nitritation using a batch reaction tank (Sequencing Batch Reactor, hereinafter abbreviated as 'reactor'). At the time, the sequencing batch reactor unit 110 performs partial nitritation until the ratio of concentration of ammonia and nitrite nitrogen reaches a preset value.

The multi-functional equalization tank 120 receives and stores wastewater passing through the sequencing batch reactor unit 110 and supplies an appropriate amount of wastewater to the anammox reactor 130. The amount of wastewater treated and discharged from the sequencing batch reactor unit 110 and the reaction time may not match those of the anammox reactor 130. Accordingly, the multi-functional equalization tank 120 is located between both 110 and 130, and only the amount of wastewater that can be treated by the anammox reactor 130 is supplied to the anammox reactor 130.

The anammox reactor 130 receives wastewater provided from the multi-functional equalization tank 120 through the sequencing batch reactor unit 110 and removes nitrogen from the wastewater. The anammox reactor 130 includes an annamox microorganisms. The anammox reaction corresponds to a reaction in which an anammox microorganism oxidizes ammonia nitrogen by using the nitrite nitrogen as an electron accepter under anaerobic(anoxic) condition. Accordingly, ammonia nitrogen is converted to nitrogen gas resulting in removing nitrogen form wastewater. The anammox reaction is as follow $$1.0NH_4+1.32NO_2^-+0.066HCO_3^-+0.13H^+\rightarrow 1.02N_2+0.26NO_3^-+0.066CH_2O_{0.5}N_{0.15}+2.03H_2O$$

Annamox microorganisms removes nitrogen without consuming organic matter or oxygen. The anammox reactor 130 removes nitrogen from the wastewater, and then discharges the treated water to the outside The anammox reactor 130 includes carriers (to be described later with reference to FIGS. 2 and 5) so that the anammox microorganisms can attach and grow on the carriers. The anammox reactor 130 allows the anammox microorganisms to form a biofilm of an appropriate thickness and perform the anammox reaction by appropriately mixing the carriers. Due to the shape of the carrier, the anammox reactor 130 can maintain the biofilm to an appropriate thickness with only normal mixing intensity without excessive mixing to maintain the thickness of the biofilm. When the biofilm thickness is maintained, wastewater can pass through the microbial space of each carrier, and the specific surface area between wastewater and microorganisms can be increased. Accordingly, the anammox reaction may occur rapidly under the same conditions, thereby increasing the processing speed.

The anammox reactor 130 may have the structure shown in FIG. 2. FIG. 2 is a diagram showing the configuration of the anammox reactor according to the first embodiment of the present invention.

Referring to FIG. 2, the anammox reactor 130 according to the first embodiment of the present disclosure includes an inlet 210, an outlet 220, a mixer 230, and carriers 240.

The inlet 210 is formed on one side of the anammox reactor 130, and the wastewater from the multi-functional equalization tank 120 is introduced through the inlet 210.

The outlet 220 is formed on one side of the anammox reactor 130 to discharge the wastewater to the outside after nitrogen is removed by the anammox microorganisms. A sieve having a size smaller than the size of the carrier 240 is attached at the outlet 220. Accordingly, the outlet 220 prevents the washout of the carrier 240 and discharges only the treated wastewater to the outside.

The mixer 230 agitates the wastewater introduced into the anammox reactor 130.

Since anaerobic(anoxic) conditions need to be maintained in the anammox reactor 130, the mixer 230 agitates the wastewater introduced into the anammox reactor 130. The agitation by the mixer 230 may be conducted at a normal intensity at which the carriers 240 can be agitated as in conventional sewage treatment processes, and need not be conducted strongly compared with normal cases to decrease the thickness of the biofilms as in the conventional art. The mixer 230 agitates the carriers 240 together with the wastewater and allows the carriers 240 to make a shear force, thereby maintaining a uniform thickness of the biofilms attached and formed in the carriers 240.

FIG. 3 is a schematic diagram of a sewage treatment apparatus according to a second embodiment of the present disclosure.

Referring to FIG. 3, a sewage treatment apparatus 300 according to a second embodiment of the present disclosure includes a settling tank 310, a bioreactor 320, a sequencing biofilm batch reactor 330, and an anammox reactor 340.

The settling tank 310 receives wastewater from the outside, and removes the solids not required for nitrogen removal in the sequencing biofilm batch reactor 330 and the anammox reactor 340. The settling tank 310 is located before the bioreactor 320. The settling tank 310 separates solids from wastewater and discharges the supernatant to the bioreactor 320.

The bioreactor 320 removes organic matters from the wastewater. Since the organic matters are not needed in the anammox reaction, the bioreactor 320 removes organic matter by using organic removal microorganisms.

Similar to the anammox reactor 130, the bioreactor 320 and the sequencing biofilm batch reactor 330 contain carriers for allowing microorganisms to attach and grow on the surface of carriers (the carriers being described later with reference to FIGS. 4 and 5). The bioreactor 320 and the sequencing biofilm batch reactor 330 agitates the carriers to allow the organic removal microorganisms to form biofilms with an appropriate thickness and to remove organic matter. Structures of the bioreactor 320 and the sequencing biofilm batch reactor 330 is shown in FIG. 4.

FIG. 4 shows structures of the bioreactor and the sequencing biofilm batch reactor according to the second embodiment of the present disclosure.

Referring to FIG. 4, the bioreactor 320 and the sequencing biofilm batch reactor 330 according to the second embodiment of the present disclosure include an inlet 210, an outlet 220, an air diffuser 410, and carriers 240.

The microorganisms attached and grown on the carriers 240 in the bioreactor 320 are microorganisms growing and activating under aerobic conditions. The bioreactor 320 may agitate the carriers 240 by including the mixer 230, like the anammox reactor 130, and may also agitate the carriers 240 by including the air diffuser 410 inside the bioreactor 320.

Referring to FIG. 3, the sequencing biofilm batch reactor 330 receives the wastewater that has passed through the settling tank 310 and the bioreactor 320, oxidizes ammonia to nitrite to adjust the ratio of ammonia and nitrite nitrogen in preset value. The sequencing biofilm batch reactor 330 adjusts the ratio of nitrite and ammonia to 1:1.32 so that the anammox reactor 340 can perform an anammox reaction.

The anammox reactor 340 removes nitrogen from the wastewater that passed through the sequencing biofilm batch reactor 330 by using the anammox microorganisms.

FIG. 5 illustrates a structure of a carrier according to an embodiment of the present disclosure.

Referring to FIG. 5, a carrier 240 according to an embodiment of the present disclosure includes protrusions 510, a central space 520, first spaces 530, second spaces 540, and third spaces 550.

As described above, carriers allow particular microorganisms to be attached and grown on the surface, regardless of whether the carriers are included in a certain component and agitated in a certain environment. The carrier 240 according to an embodiment of the present disclosure allows microorganisms to be quickly attached and grown therein at the initial stage and enables the formed biofilms to maintain an appropriate thickness thereof by an appropriate shear force, depending on the structural feature.

The carrier 240 has protrusions 510 protruding gently (in directions from the center to the outside) at regular intervals, like a shape of a circle-based flower. The carrier 240 has plural protrusions 510, so that when the carriers collide with each other during agitation, a collision may occur with a relatively small area. The carriers can transfer a greater impact to each other during the collision. This shape can decrease contact area resulting in increasing the pressure transferred to each carrier. Therefore, the carriers prevent the growing to excessively thick biofilms by applying the strong impact to each other. The protrusions 510 are implemented in a smooth form without angled portions and thus can prevent the damage that may occur when the carriers collide with each other.

The central space 520 is formed in the center of the carrier 240 to provide a space for microorganisms to be attached on the surface. The central space 520 has a relatively large area compared with the other spaces and thus can prevent clogging the space from too much attachment and growth of microorganisms. The area of the central space is so big not to be blocked by overgrowth of microorganisms, even though the carrier 240 is used for a certain time long. Hence, the wastewater can usually pass through the central space 520, so that the carrier 240 can smoothly rotate by itself. Through the presence of the central space 520, the carrier can rotate by itself, and the thickness of microorganisms attached in the carrier can be maintained by itself, thereby requiring no additional agitation for thickness control, leading to energy saving.

The central space 520 has protrusions 525 protruding toward to the center partially or regularly. The presence of the protrusions 525 can attach a relatively large number of microorganisms compared with the absence of the protrusions.

The first spaces 530 are located right next to the central space 520 in directions away from the center of the carrier 240 to provide spaces for microorganisms to be quickly attached on. The first spaces 530 are located farther than the central space 520 from the center of the carrier 240 but located adjacent to the central space 520. The first space 530 has the smallest area in the spaces 520 to 550. In the rotation of the carrier 240 by itself, the closer to the center, a relatively small shear force is generated. Hence, the first spaces 530 allow microorganisms to be quickly attached and grown. Especially, when the carriers are initially put into, it is difficult for microorganisms to quickly attach on the carriers 240. The first spaces 530 have a relatively small area and are located adjacent to the central space 520, the first spaces 530 undergo a smaller shear force and thus enable microorganisms to be quickly attached and grown on the carriers at the initial stage. In addition, the carrier can rotate by itself since the central space 520 is not blocked by microorganisms. The central space 520 can prevent microorganisms from blocking the first spaces. These carriers can be confirmed in FIG. 6.

FIG. 6 shows an example of implementing the carrier according to the embodiment of the present disclosure.

Referring to FIG. 6, it can be confirmed that relatively many microorganisms are attached in the first spaces 530 but relatively few microorganisms are attached in the second spaces 540 and the third spaces 550. By a relatively small area and a relatively small shear force, microorganisms can be smoothly attached in the first spaces 530 at the initial stage.

Referring to FIG. 5, the second spaces 540 are located adjacent to the first spaces 530 in directions away from the center of the carrier 240 to provide spaces for microorganisms to be attached therein. That is, the second spaces 540 are located between the first spaces 530 and the third spaces 550. The second spaces 540 have a larger area than the first spaces 530 but have a relatively small area compared with the third spaces 550 and the central space 520. Since the second spaces 540 are located adjacent to the first spaces 530, the microorganisms attached and grown in the first spaces 530 can also be smoothly attached in the second spaces 540 adjacent thereto. The second spaces 540 have a relatively wide area and thus allow more microorganisms to be attached and grown therein. The second spaces 540 are located relatively far from the center, and thus undergo a relatively large shear force. Therefore, the second spaces 540 can prevent the blocking thereof due to the attachment and growth of microorganisms.

The third spaces 550 are located at the outermost part in directions away from the center of the carrier 240 to provide spaces for microorganisms to be attached therein. That is, the third spaces 550 are located at the outermost part of the carrier and located adjacent to the second spaces 540. The third spaces 550 have a smaller area than the central space 520 but have a relatively wide area compared with the first spaces 530 and the second spaces 540. The other microorganisms that are not attached in the first spaces 530 and the second spaces 540 are attached and grown in the third spaces 550. The third spaces 550 have a relatively wide area and thus allow more microorganisms to be attached and grown therein. However, the third spaces 550 are located farthest from the center and thus undergo the largest shear force. Hence, the third spaces 550 can prevent the blocking due to the attachment and growth of microorganism.

As each space 520 to 550 in the carrier 240 is implemented in the above-described structure, the carrier 240 may have a network structure or a honeycomb structure.

As such, by the space area for the central space 520 and by the position and a change in area for the other spaces 530 to 550, the microorganisms growing in each space form a biofilm having a uniform thickness and can maintain the corresponding thickness. Especially, different magnitudes of shear forces are applied to different locations due to the afore mentioned structure, and thus the blocking of the respective spaces 520 to 550 by the microorganisms attached in the corresponding spaces can be prevented. Since the respective spaces 520 to 550 are not blocked by microorganisms, wastewater can pass through the respective spaces 520 to 550. Hence, the contact area between the wastewater and the microorganisms attached and grown in the carrier 240 can be significantly increased.

The carrier 240 is characterized in that, based on the axis through which wastewater passes, all sections perpendicular to the corresponding axis are uniform. Therefore, the carrier 240 may be fabricated by injection. Since the carrier 240 may be fabricated by injection, the carrier is excellent in terms of productivity.

FIG. 7 illustrates a conventional carrier and the carrier according to the embodiment of the present disclosure when operated for some period of time; FIG. 8 is a graph showing the rates of nitrification of ammonia nitrogen or nitrite nitrogen by the conventional carrier and the carrier according to the embodiment of the present disclosure; and FIG. 9 is a graph showing the weights of the conventional carrier and the carrier according to the embodiment of the present disclosure when operated for some period of time.

Referring to FIG. 7, it can be confirmed that when the carriers were disposed in a particular component to allow microorganisms to be attached and grown therein for a some period of time, the microorganisms were densely grown in each space of the conventional carrier until the microorganisms blocked most of the spaces as shown in FIG. 7A. However, the carrier according to the embodiment of the present disclosure was configured to have different areas at different locations as shown in FIG. 7B, biofilms with a uniform thickness were formed in the respective spaces and a penetration hole is formed to allow wastewater to pass therethrough.

Referring to FIG. 8 as data supporting the afore mentioned results, it can be confirmed that the nitrification rate was relatively significant higher in the carrier according to the embodiment of the present disclosure than that of conventional carrier. The meaning that the nitrification rate due to a larger contact area between microorganisms and sewage. It can be especially confirmed that the difference in rate was nearly doubled at the initial stage of operation (an operating time of 5 to 10 days). As described above, the carrier according to the embodiment of the present disclosure enables microorganisms to be quickly attached therein at the initial stage of operation through the presence of the central space 520 and the adjustment of locations and changes in area of the first to third spaces.

Referring to FIG. 9, it can be confirmed that the conventional carrier having microorganisms attached and grown therein for some period had a relatively significant large weight. However, it can be confirmed that the weight per piece of the carrier according to the embodiment of the present disclosure was maintained about ⅓ times compared with that of the conventional carrier.

In the conventional carrier, the amount of air for agitation or aeration needed to be increased by energy consumption in order to decrease the thickness of formed biofilms (decrease the number of microorganisms attached in each space). Such a case showed a relatively decreased thickness of biofilms, but the biofilms were still thick compared with the carrier according to the embodiment of the present disclosure.

That is, the carrier according to the embodiment of the present disclosure can appropriately maintain the thickness of biofilms even without excessive energy consumption depending on the structural feature thereof.

FIG. 10 shows a structure of an anammox reactor according to a third embodiment of the present disclosure.

Referring to FIG. 10, an anammox reactor 130 according to a third embodiment of the present disclosure includes an inlet 1010, an outlet 1020, a mixer 1030, and complex carriers 1040 and 1045. The inlet 1010, the outlet 1020, and the mixer 1030 perform the same operations as the inlet 210, the outlet 220, and the mixer 230.

First carriers 1040 have the same structure as the carriers 240 and allow microorganisms to be attached and grown therein.

Second carriers 1045 are configured to allow some of the microorganisms, attached and grown in the first carriers 1040, to be detached from the first carriers 1040. The second carriers 1045 are contained at a predetermined volume proportion relative to the first carriers 1040, thereby preventing microorganisms from being excessively grown in the first carriers 1040 to an extent to which spaces in the first carriers 1040 are blocked. The inclusion of an excess of the second carriers 1045 control attachment and growth of microorganisms in the first carriers 1040, and thus the second carriers 1045 are contained at a volume proportion of 1 to −10% relative to the first carriers 1040. Since the second carriers 1045 need to detach some of the microorganisms attached and grown in the first carriers 1040, the second carriers 1045 may have similar specific gravity to or a larger specific gravity than the first carriers 1040.

FIG. 11 is a schematic diagram of a sewage treatment apparatus according to a fourth embodiment of the present disclosure; and FIG. 12 illustrates structures of a bioreactor and a sequencing biofilm batch reactor according to the fourth embodiment of the present disclosure.

Referring to FIGS. 11 and 12, a sewage treatment process 1100 according to the fourth embodiment of the present disclosure includes a settling tank 1110, a bioreactor 1120, a sequencing biofilm batch reactor 1130, and an anammox reactor 1140. The settling tank 1110, the bioreactor 1120, the sequencing biofilm batch reactor 1130, and the anammox reactor 1140 perform the same operations as the settling tank 310, the bioreactor 320, the sequencing biofilm batch reactor 330, and the anammox reactor 340 except that the bioreactor 1120 and the sequencing biofilm batch reactor 1130 contain complex carriers 1040 and 1045 instead of the carriers 240 and 245.

FIG. 13 illustrates a structure of a second carrier according to an embodiment of the present disclosure.

Referring to FIG. 13, a second carrier 1045 according to an embodiment of the present disclosure includes a plural protrusions 1310.

The second carrier 1045 includes the plural protrusions 1310 protruding in respective directions from the center. For example, the second carrier 1045 may have a cross (+) form as shown in FIG. 13 when four protrusions 1310 are included. The shape of the second carrier may be changed when the number of protrusions is increased. The protrusion 1310 has two edges 1315 unlike the protrusion 510 in the carrier 240. Since the protrusion 1310 includes the edges 1315, the edges 1315 can be used to penetrate each space of the first carrier 1040 during agitation or aeration. The second carrier 1045 can penetrate each space of the first carrier 1040 by using the edges 1315, thereby preventing the clogging of the spaces due to the growth of excessively many microorganisms in each space.

The second carrier 1045 could be relatively smaller than the first carrier 1040 such that the edges 1315 can be used to penetrate even the first spaces 530 of the first carrier 1040. Since the size or diameter (or cross-sectional area) of the edges 1315 becomes smaller, the edges can more smoothly penetrate all the spaces 520 to 550 of the first carrier 1040.

The second carrier 1045 may have a relatively large specific gravity compared with the first carrier 1040. Since the second carrier 1045 could be smaller than the first carrier 1040 as described above, the second carrier 1045 may have a relatively large specific gravity to more effectively penetrate each space of the first carrier 1040.

Since the second carrier 1045 has the afore mentioned structure, the thickness of the biofilms growing in spaces 520 to 550 of the first carrier 1040 can be controlled. Especially, the second carriers 1045 are contained at a volume proportion of only 1 to 10% relative to the first carriers 1040, so that a biofilm with an appropriate thickness can be grown in each space of the first carrier 1040 and the clogging of each space can be prevented. Hence, the first carriers 1040 can have an optimum biofilm thickness to maintain fast flux in the biofilm.

The second carriers 1045 would washout through the outlet 1020 due to a relatively small size. The washout of the second carriers 1045 through the outlet 1020 may cause an additional problem in an apparatus that receives and treats effluent. To prevent the problem, the second carriers 1045 may be configured of an ingredient which can be dissolved in the wastewater or treated water after a predetermined period. Hence, the second carriers 1045 can maintain the thickness of biofilms of the first carriers 1040 while agitated together with the first carriers 1040 and can prevent in advance problems due to the outflow thereof since the second carriers 1045 are dissolved at the time of discharge or a predetermined time after discharge.

In addition, the second carrier 1045 includes the plural protrusions 1310 protruding in respective directions from the center and thus can be fabricated by injection.

FIG. 14 illustrates a structure of a second carrier according to another embodiment of the present disclosure.

Referring to FIG. 14, a second carrier 1045 according to another embodiment of the present disclosure includes protrusions 1410, tips 1415, and valleys 1420.

The second carrier 1045 also has a plural protrusions 1410 protruding in respective directions from the center, similar to the second carrier described with reference to FIG. 13. Each protrusion 1410 includes a valley 1420 at the far end from the center of the carrier. The valley 1420 is configured in the form in which the center (or a portion) of the protrusion 1410 is dented by about a predetermined depth, such as a 'V' shape or a 'U' shape, and the tip 1415 is formed at each end of the protrusion 1410. As such, one or more valleys 1420 are formed in the protrusion 1410 and two or more tips 1415 are formed. Especially, the valley 1420 is formed in the protrusion 1410 such that the diameter (or cross-sectional area) of the tip 1415 is smaller than the diameter (or cross-sectional area) of each space, especially, the first spaces 530, of the first carrier 1040.

Since the diameter (or cross-sectional area) of the formed tip 1415 is smaller than the diameter (or cross-sectional area) of each space, especially, the first spaces 530, of the first carrier 1040, the tip 1415 has a structure capable of passing through any space of the first carrier 1040. Hence, the second carrier 1045 can more easily adjust the thickness of the biofilms formed in the first carrier 1040, compared with the second carrier (according to the embodiment of the present disclosure) described with reference to FIG. 13.

FIG. 15 illustrates a structure of a second carrier according to still another embodiment of the present disclosure.

Referring to FIG. 15, a second carrier 1045 according to still another embodiment of the present disclosure includes a body 1510 and tips 1520.

The body 1510 holds the tips 1520 such that the tips 1520 can be fixed to the body 1510. The body 1510 fixes all the plural tips 1520 and may be configured in a spherical shape to minimize the directivity of the tips 1520.

The tip 1520 has a structure of protruding from the body 1510, and the plural tips may be configured on the body 1510 at regular intervals with each other or randomly. Similar to the tip 1415, the diameter (or cross-sectional area) of the tip 1520 is also smaller than the diameter (or cross-sectional area) of each space, especially the first space 530, of the first carrier 1040, and thus the tips 1415 pass through the spaces 520 to 550 of the first carrier 1040, thereby adjusting the thickness of biofilms.

The second carrier 1045 according to still another embodiment of the present disclosure can be configured to have relatively many tips 1520 compared with the second carriers shown in FIGS. 13 and 14, so that even though the second carriers 1045 are contained at a relatively small volume proportion, the second carriers 1045 can ensure the same or similar efficiency.

Although the embodiments of the present disclosure have been described for illustrative purposes, those skilled in the art will appreciate that various modifications, additions and substitutions are possible, without departing from the spirit and scope of the claimed invention. Accordingly, the embodiments disclosed herein are intended to illustrate but not limit the technical spirit of the present disclosure, and the scope of the embodiments of the present disclosure is not limited by these embodiments. The scope of protection of the present disclosure should be construed based on the accompanying claims, and all the technical ideas included within the scope equivalent to the claims should be construed as being included within the right scope of the present disclosure.

The present patent application encompasses the results of a research supported by Korea Testing Laboratory with funding from the Korean government (Ministry of Environment) in 2020 (Project No.: 2020003170009, Project title: Biogas Production Increase/Sludge Reduction and Commercialization of Optimal Reject Water Treatment System).

The invention claimed is:

1. A carrier comprising:

a central space formed in a center to provide a space for microorganisms to be attached therein;

first spaces located adjacent to the central space in directions away from the center to provide spaces for microorganisms to be attached therein;

second spaces located adjacent to the first spaces in directions away from the center to provide spaces for microorganisms to be attached therein; and third spaces located at an outermost part to provide spaces for microorganisms to be attached therein, wherein the central space, the first spaces, the second spaces, and the third spaces are each formed as a penetration hole through which wastewater passes, and are arranged in a network structure or a honeycomb structure, wherein areas of the first spaces, the second spaces, the third spaces, and the central space increase in the order of the first spaces, the second spaces, the third spaces, and the central space, and wherein an area of the central space is not blocked by microorganisms, regardless of time, even though the microorganisms are attached and grown in the central space, and the central space allows wastewater to pass through an inside thereof, so that the carrier rotates by itself.

2. The carrier of claim 1, wherein a magnitude of shear forces applied to each space increases in the order of the first spaces, the second spaces, and the third spaces.

3. The carrier of claim 1, further comprising protrusions that gently protrude to an outside at predetermined intervals on an outer surface, wherein the protrusions are implemented in a smooth form without angled portions.

4. The carrier of claim 3, wherein the protrusions increase an impact applied to each carrier when carriers collide with each other.

5. A complex carrier included in one component of a sewage treatment apparatus to allow microorganisms to be attached and grown therein, the complex carrier comprising:

a first carrier having a plural space for microorganisms to be attached therein to allow microorganisms to be attached and grown therein; and a second carrier physically separate from the first carrier and having a structure capable of penetrating or passing through the spaces of the first carrier to control a thickness of biofilms formed in the spaces of the first carrier.

6. The complex carrier of claim 5, wherein the second carrier comprises plural protrusions protruding in respective directions from a center thereof.

7. The complex carrier of claim 5, wherein the second carrier comprises a plural protrusion protruding in respective directions from the center thereof, each protrusion comprising a valley and at least two tips.

8. The complex carrier of claim 7, wherein the valley has a form in which a portion of the protrusion is dented by a predetermined depth at an end of each protrusion far from the center of the second carrier.

9. The complex carrier of claim 8, wherein the valley is formed in a "V" shape or a "U" shape.

10. The complex carrier of claim 7, wherein the tips have a diameter smaller than the diameter of the spaces of the first carrier.

11. The complex carrier of claim 5, wherein the second carrier comprises:

a body; and a plural tip protruding from the body at regular intervals between each other or randomly.

* * * * *